United States Patent [19]

Kato et al.

[11] Patent Number: 4,537,873

[45] Date of Patent: Aug. 27, 1985

[54] CATALYST FOR CATALYTIC COMBUSTION

[75] Inventors: Akira Kato, Hitachi; Tomoichi Kamo, Ibaraki; Shigeo Uno, Hitachi; Hiroshi Kawagoshi, Hitachi; Hisao Yamashita, Hitachi; Shinpei Matsuda, Ibaraki, all of Japan

[73] Assignee: Hitachi, Ltd., Tokyo, Japan

[21] Appl. No.: 556,049

[22] Filed: Nov. 29, 1983

[30] Foreign Application Priority Data

Nov. 29, 1982 [JP] Japan ................................ 57-207749
Mar. 4, 1983 [JP] Japan ................................ 58-34380

[51] Int. Cl.³ ............................................. B01J 21/06
[52] U.S. Cl. .................................. 502/242; 502/241; 502/256; 502/259; 502/260; 502/261; 502/262; 502/303; 502/304; 502/324; 502/333; 502/339; 502/340; 502/349; 502/350; 502/351; 502/352; 502/355; 502/439
[58] Field of Search ............... 502/235, 238, 252, 261, 502/262, 263, 304, 308, 309, 310, 327, 328, 334, 333, 439, 349, 350, 352, 351, 241, 256, 259, 260, 242

[56] References Cited

U.S. PATENT DOCUMENTS

| | | | |
|---|---|---|---|
| 3,852,215 | 12/1974 | Duhaut et al. | 502/334 |
| 3,894,965 | 7/1975 | Foster et al. | 502/261 |
| 3,900,429 | 8/1975 | Komatsu et al. | 502/309 |
| 3,903,020 | 9/1975 | Sergeys et al. | 502/262 |
| 3,937,797 | 2/1976 | Romanski et al. | 502/350 |
| 4,113,660 | 9/1978 | Abe et al. | 502/350 |
| 4,128,505 | 12/1978 | Mikovsky et al. | 502/309 |
| 4,149,998 | 4/1979 | Tauster et al. | 502/328 |
| 4,220,559 | 9/1980 | Polinski | 502/261 |
| 4,229,604 | 10/1980 | Tmenov et al. | 502/252 |
| 4,350,613 | 9/1982 | Nishino et al. | 502/309 |
| 4,369,132 | 1/1983 | Kinoshita et al. | 502/261 |
| 4,459,372 | 7/1984 | Arena | 502/349 |

*Primary Examiner*—D. E. Gantz
*Assistant Examiner*—Anthony McFarlane
*Attorney, Agent, or Firm*—Antonelli, Terry & Wands

[57] ABSTRACT

A catalyst comprising precious metal particles supported on a carrier obtained from (a) titania as a first component and (b) as a second component at least one metal oxide selected from oxides of magnesium, strontium, lanthanum, yttrium, cerium, zirconium, silicon and tin, is effective for catalytic combustion of a fuel at a temperature of 400° to 1500° C. with excellent durability.

18 Claims, 1 Drawing Figure

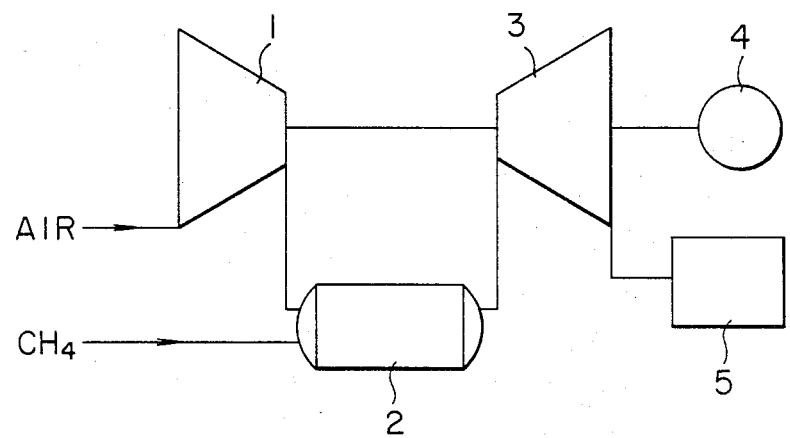

CATALYST FOR CATALYTIC COMBUSTION

BACKGROUND OF THE INVENTION

1. Field of the Invention

This invention relates to a catalyst for catalytic combustion of a fuel used in an apparatus wherein high-temperature gases formed from said fuel are utilized, and particularly to a catalyst for catalytic combustion comprising a precious metal supported on a special carrier, said catalyst being very slight in lowering in performance even under high temperatures.

2. Description of the Prior Art

The catalytic combustion method wherein the reaction between a fuel and oxygen is accelerated on a catalyst is particularly noticed recently and has the following features: (1) complete combustion is possible at low temperatures, (2) complete combustion is possible in a wide fuel/air ratio, and (3) thermal $NO_x$ ($x=1, 2$, etc.) is hardly produced. As techniques applying the catalytic combustion technique, there are (a) an oxidation treatment of organic solvents and bad odors, (b) an automobile exhaust gas treatment, (c) a catalytic combustion type heater, etc. Further, techniques applying the catalytic combustion technique so as to make the best use of the above-mentioned features have been developed in various fields such as large-capacity boilers, gas turbines, jet engines for air planes, etc. These are techniques applying high-temperature gases obtained by catalytic combustion of a fuel and are essentially different from the automobile exhaust gas treatment and the process for removing harmful components such as removing a bad odor.

The temperature at which the catalyst for producing high-temperature gases by catalytic combustion of a fuel is used is usually 400° C. or higher, and sometimes reaches 1400° to 1500° C. Therefore, the catalyst is required to have catalytic activity in a temperature range of from 400° C. to 1400° C. or higher and at the same time to be slight in deterioration by heat particularly at high temperatures. The temperatures used in conventional catalytic combustion methods are 200° to 500° C. for removing a bad odor and 800° to 900° C. at most for automobile exhaust gas treatment.

As catalysts, there are generally known those carrying precious metals, particularly platinum, palladium and rhodium on carriers having a large specific surface area such as alumina, silica, etc. (e.g. disclosed in U.S. Pat. No. 4,220,559). Since these precious metal catalysts are thermally stable compared with other metal oxide catalysts, they are used under the temperature conditions of 800° to 900° C. such as for automobile exhaust gas treatment. But in a process wherein heat energy is taken out of chemical energy by catalytic combustion of a fuel, a catalyst is used at a reaction temperature of 1000° C. or higher, sometimes up to 1400° C. to 1500° C. depending on conditions. Under such conditions, even the precious metal catalysts are suffered from deterioration by heat to lower their performance remarkably. As causes for such deterioration, it can be pointed out that finely divided precious metal particles dispersed on carrier are agglomerated due to the high temperature or the specific surface area of carrier is reduced due to sintering of the carrier.

SUMMARY OF THE INVENTION

It is an object of this invention to provide a catalyst for catalytic combustion overcoming the defects of the prior art technique mentioned above, and exhibiting only a slight lowering of performance even used at high temperatures, said catalyst being obtained by carrying a precious metal on a carrier which can prevent the agglomeration of the precious metal component under high temperature conditions and exhibiting only a slight lowering of the specific surface area by sintering.

This invention provides a catalyst for catalytic combustion comprising precious metal particles supported on a carrier obtained from (a) titania as a first component and (b) as a second component at least one metal oxide selected from the group consisting of oxides of magnesium, strontium, lanthanum, yttrium, cerium, zirconium, silicon and tin.

BRIEF DESCRIPTION OF THE DRAWING

The attached drawing is a schematic diagram of an apparatus wherein the catalyst of this invention is used.

DESCRIPTION OF PREFERRED EMBODIMENTS

The present invention studied various carriers having effects for preventing the precious metal fine particles from agglomeration at high temperatures and found that when titania was used as a carrier, the agglomeration of precious metal component difficulty took place compared with the case of using a conventional alumina carrier. This seems to be derived from strong mutual actions of the precious metal component and titania. But when only titania was used as carrier, the specific surface area was lowered remarkably at 700° C. or higher and the catalytic activity was lowered resultantly, since titania sinters suddenly at 700° C. or higher.

The present inventors further studied prevention of sintering of titania by adding various kinds of second components to titania and found that when at least one oxide of metal selected from the group consisting of magnesium, strontium, lanthanum, yttrium, cerium, zirconium, silicon and tin was added as a second component to the first component titania, the sintering of titania was able to be prevented, and as a result, a high specific surface area was maintained. Thus, this invention was accomplished.

According to the present invention, the catalyst for catalytic combustion having excellent activity and durability is obtained by supporting the precious metal component on a special carrier obtained from the combination of titania and a special metal oxide mentioned above.

In addition, the carrier containing titania used in this invention has better resistance to $SO_x$ ($x=2, 3$) than a conventional alumina carrier, so that the carrier used in this invention has a feature in that it is hardly denatured even if a fuel to be used contains sulfur compounds. (In the case of alumina carrier, alumina is often denatured to aluminum sulfate).

The titania series carrier used in this invention preferably contains the first component titania and the second component metal oxide in an atomic ratio of Ti/the second component metal = 1/0.05 to less than 1:1. When the amount of the second component metal is less than 0.05, the effect of addition of the second component metal is insufficient, while when the amount of the second component metal is 1.0 or higher, the proportion of titania becomes too small to exhibit the effect of titania series carrier.

The titania series carrier used in this invention can be obtained by simply mixing the first component titania and the second component of one or more metal oxides, or by forming a compound from the first component titania and the second component of one or more metal oxides. When two or more metal oxides are used as the second component, these metal oxides can be used as a mixture thereof or as a compound obtained therefrom.

As titanium starting materials for preparing the carrier used in this invention, there can be used various kinds of titania, substances which can form titania by heating such as titanic acid ($TiO_2 \cdot nH_2O$), titanium tetrachloride, titanium sulfate, titanyl sulfate, etc. Titania can also be produced preferably by neutralizing an aqueous solution of titanium tetrachloride or titanium sulfate with ammonia water, a caustic alkali, an alkali carbonate, urea, or the like to produce a precipitate, which is subjected to pyrolysis to give the oxide. It is also possible to use organotitanium compounds such as titanium tetraisopropoxide, etc.

As starting materials for the second component, there can be used oxides, hydroxides, chlorides, nitrates, sulfates, carbonates and organic acid salts such as acetates, oxalates, etc., of Mg, Sr, La, Y, Ce, Zr, Si and Sn.

The carrier used in this invention can be prepared by conventional methods such as a precipitation method, a co-precipitation method, a kneading method and an impregnating method. For example, the carrier can be prepared by mixing a titanium starting material and the second component starting material and forming the oxides finally, or alternatively forming individual oxides and then mixing and kneading the oxides well.

As molding methods of the carrier, there can be used a tableting method, an extrusion method, a rolling granulating method, and the like conventionally used method. Further, the carrier used in this invention can be prepared by impregnating a honeycomb refractory carrier with a solution containing the first and second components used in this invention, followed by calcination to form the desired oxide layer on the surface of the carrier. It is also possible to use a carrier obtained by forming a layer of titania and the second component metal oxide on the surface of a honeycomb refractory carrier or a conventional carrier such as alumina ($Al_2O_3$), silica ($SiO_2$), silica-alumina ($SiO_2-Al_2O_3$), etc., by a coating, or the like method.

As the precious metal component supported on the carrier, there can be used platinum, palladium, ruthenium, iridium, rhodium, or a mixture thereof.

The precious metal component can be carried on the carrier by an impregnating method, a kneading method or the like conventionally used method. It is preferable to support the precious metal component on the carrier in an amount of 0.1 to 3% by weight based on the weight of the carrier.

As starting materials for the precious metal component, there can be used salts and complexes of precious metals such as chloroplatinic acid, ammonium bromoplatinate, palladium chloride, palladium nitrate, rhodium chloride, ruthenium chloride, iridium chloride, etc.

The catalyst of this invention may further contain as active component one or more transition metals such as nickel, cobalt, manganese, chromium, etc. (as co-catalyst component) other than the precious metal component.

In the case of using at least one metal oxide wherein the metal is yttrium, cerium and lanthanum as the second component, it is preferable to employ one of the following two catalyst preparation methods.

One of these methods is to clad titania with at least one compound selected from yttrium, cerium and lanthanum compounds which can form oxides by calcination, followed by drying and calcination to form a carrier and a solution containing colloidal precious metal very fine particles is coated on the carrier, followed by drying and calcination.

Another method is to clad titania with a mixture of at least one metal oxide selected from oxides of yttrium, cerium and lanthanum in very fine particles and colloidal precious metal fine particles, followed by drying and calcination.

In the above-mentioned two methods, at least one metal oxide selected from oxides of yttrium, cerium and lanthanum has catalytic activity by itself and increases thermal stability of the catalyst due to high melting points of these metal oxides.

It is also possible to obtain titania containing at least one metal oxide selected from oxides of yttrium, cerium and lanthanum by impregnating titania with an aqueous solution of at least one salt of yttrium, cerium or lanthanum or by coating titania with at least one metal oxide selected from oxides of these rare earth metals (yttrium, cerium and lanthanum), followed by drying and calcination.

The colloidal precious metal fine particles can be prepared as follows. First, a solution is prepared by dissolving a hydrophilic high polymer in an aqueous alcohol solution containing precious metal ions of Pt, Pd, Ru, In or Rh. It is preferable to use 0.1 to 2.0 parts by volume of alcohol per part by volume of water. Further, it is preferable to use 0.5 to 20 parts by weight of the hydrophilic high polymer per part by weight of the precious metal element. The resulting mixed solution is heated to near the azeotropic point of the azeotropic mixture of alcohol and water and stirring is continued under reflux-cooling for several hours. During such a period, precious metal ions are deposited as metal fine particles in the solution by reduction of the precious metal ions with the alcohol. Since the precious metal fine particles are protected by the hydrophilic high polymer, they are dispersed uniformly as colloid having a particle size of about 100 Å or less.

The resulting colloidal dispersion of precious metal can be supported on a carrier wherein titania contains at least one metal oxide selected from oxides of yttrium, cerium and lanthanum by, for example, a dip method, a spray method or the like conventionally used.

Alternatively, an alkaline solution is added to a solution containing at least one of yttrium, cerium and lanthanum and at least one hydroxide selected from hydroxides of yttrium, cerium and lanthanum thus produced is filtered, washed, dried, calcined and pulverized to give a fine powder, or a fine powder of oxide is obtained by heat treatment of at least one compound selected from compounds of yttrium, cerium and lanthanum, and to the fine powder is added an aqueous solution of precious metal to make a suspension, followed by addition of a hydrophilic high polymer and an aqueous alcohol solution. The resulting suspension is heated at near the azeotropic point of the azeotropic mixture of alcohol and water and stirring is continued under reflux-cooling to form an oxide powder of at least one of yttrium, cerium and lanthanum on which colloidal particles of precious metal are adsorbed. The thus obtained mixture of at least one oxide of yttrium, cerium or lanthanum and a colloidal precious metal can be coated on titania. Further, it is also possible to coat a slurry obtained by sufficiently mixing the above-mentioned rare earth metal oxide powder with the colloidal precious metal particles in a mixing and grinding machine on titania, followed by drying and calcining to obtain the desired catalyst of this invention.

As the aqueous alcohol mentioned above, there can be used methanol, ethanol, isopropanol, and the like. Among these alcohols, methanol is particularly preferable from the viewpoint of great reducing power and low boiling point.

As the hydrophilic high polymer mentioned above, there can be used poly(vinyl alcohol), poly(methyl vinyl ether), poly(vinyl pyrrolidone), gelatin, gum arabic, etc. From the viewpoint of easiness in handling, the use of poly(vinyl alcohol) is more preferable.

As the fuel used in the catalytic combustion using the catalyst of this invention, there can be used various gaseous fuels and liquid fuels. Examples of these fuels are aliphatic hydrocarbons such as methane, ethane, propane, butane, etc., petroleum fractions such as gasoline, naphtha, kerosene, gas oil, etc., alcohols such as metanol, ethanol, etc., hydrogen and carbon monoxide. In the case of solid fuels such as coal, these fuels may be used as fuel after gasification or liquefaction. It is also possible to use diluted fuels containing inactive material or materials such as low-calorie coal gas, coke over gas, etc.

It is possible to conduct effective combustion of a fuel at a wide temperature range of preferably 400° C. to 1500° C., more preferably 450° C. to 1400° C. When the reaction (combustion) temperature is higher than 1500° C., even the catalyst of this invention undesirably lowers its activity greatly due to the sintering or vaporization of the precious metal component. The catalyst of this invention can be used even at a temperature lower than 400° C. Particularly in the case of a fuel having good combusting properties like hydrogen, effective combustion can be carried out even at a temperature lower than 400° C. Further, in the case of combustion reaction, since the temperature rise due to the reaction is large, even if the reaction starting temperature, that is, the catch fire temperature is lower than 400° C., the combustion temperature range often rises to 1000° C. or higher. In such a case, the temperature range of lower than 400° C. belongs, needless to say, to the temperature range using the catalyst of this invention.

The catalyst of this invention can be used, for example, in an apparatus as shown by the attached drawing, wherein numeral 1 denotes a compressor, numeral 2 a catalytic combustion chamber, numeral 3 a gas turbine, numeral 4 a power generator, and numeral 5 a steam turbine.

As shown in the drawing, it is preferable to use a part of air blowing into the gas turbine as an oxidizing agent for the fuel by sending it to the catalytic combustion chamber through the compressor.

This invention is explained by way of the following Examples and Comparative Examples, wherein all percents are by weight unless otherwise specified.

EXAMPLE 1 AND COMPARATIVE EXAMPLES 1 AND 2

(1) Preparation of Catalyst

A catalyst of platinum-titania.magnesia series (Example 1) and a platinum-titania catalyst (Comparative Example 1) and a platinum-alumina catalyst (Comparative Example 2) for comparison were prepared as follows.

(a) Catalyst of Example 1

A meta-titanic acid slurry in an amount of 500 g (150 g as $TiO_2$) was added to 240 g of magnesium nitrate. To the resulting mixture, 500 ml of distilled water was added and the resulting mixture was kneaded in a kneader sufficiently. The resulting paste-like mixture was pre-calcined at 300° C. for 5 hours. Then, graphite was added to the pre-calcined product in an amount of 3%, followed by tableting under a molding pressure of about 500 kg/cm$^2$ with a size of 3 mm in diameter and 3 mm in thickness. The resulting molded articles (tablets) were calcined at 700° C. for 4 hours. The resulting calcined molded articles were impregnated with 100 ml of an aqueous solution of hexachloroplatinic acid, dried at 120° C. for 5 hours, and calcined in air at 1000° C. for 3 hours. The composition of carrier was Ti:Mg=1:0.5 in atomic ratio and the amount of platinum supported on the carrier was 1% based on the weight of the carrier.

(b) Catalyst of Comparative Example 1

After pre-calcining 500 g of a meta-titanic acid slurry at 300° C. for 5 hours, 3% of graphite was added thereto. The resulting mixture was subjected to tableting under a molding pressure of about 500 kg/cm$^2$ with a size of 3 mm in diameter and 3 mm in thickness. The resulting molded articles (tablets) were calcined at 700° C. for 4 hours. The resulting calcined tablets were impregnated with 50 ml of an aqueous solution of hexachloroplatinic acid (3 g Pt/100 g aq. solution), dried at 120° C. for 5 hours, and calcined in air at 1000° C. for 3 hours. The resulting catalyst contained platinum in an amount of 1% based on the weight of titania carrier.

(c) Catalyst of Comparative Example 2

Alumina carrier in spherical form having a size of 3 mm in an amount of 100 g was impregnated with 40 ml of an aqueous solution of hexachloroplatinic acid (2.5 g Pt/100 g of aq. solution), dried at 120° C. for 5 hours, and calcined in air at 1000° C. for 3 hours. The resulting catalyst contained platinum in an amount of 1% based on the weight of alumina carrier.

(2) Catalyst Preformance Test

The above-mentioned catalysts prepared in (a), (b) and (c) were subjected to the following catalyst performance test.

In a reactor tube made of silica glass having an inner diameter of 20 mm, 8 ml of a catalyst to be tested was packed. A gas to be introduced into the catalyst layer was pre-heated at 500° C. from the outside by an electric furnace. Through the reactor tube, a gas mixture containing 3% of methane and the balance air was passed at a space velocity of 50,000 hour$^{-1}$ for 10 hours continuously. The reaction rate was obtained by measuring the content of methane at the inlet and outlet of the catalyst layer by a FID (flame ionization detector) type gas chromatograph. The temperature of the catalyst layer reached about 1200° C. due to combustion of methane.

The results obtained are shown in Table 1.

TABLE 1

| Example | Component of catalyst | Reaction rate (%) Test time (hour) | |
|---|---|---|---|
| | | 1 | 10 |
| Example 1 | Pt—titan.magnesia | 99.8 | 99.5 |
| Comparative Example 1 | Pt—titania | 87.0 | 62.0 |
| Comparative Example 2 | Pt—alumina | 88.0 | 76.5 |

As is clear from Table 1, the catalyst of Example 1 according to this invention is excellent both in activity and durability compared with the catalysts of Comparative Examples 1 and 2.

EXAMPLE 2 AND COMPARATIVE EXAMPLES 3 AND 4

(1) Preparation of Catalyst

A catalyst of palladium-titania.zirconia series (Example 2) and a palladium-titania catalyst (Comparative Example 3) and a palladium-alumina catalyst (Comparative Example 4) for comparison were prepared as follows.

(a) Catalyst of Example 2

500 Grams of a titanium tetrachloride (TiCl$_4$) solution was dissolved in 1 liter of distilled water. The resulting solution was gradually added dropwise to 1 N aqueous solution of sodium hydroxide to produce a precipitate of titanic acid. The produced precipitate was decanted and washed with distilled water, followed by filtration. To this, 352 g of zirconium nitrate [ZrO(NO$_3$)$_2$.2H$_2$O] was added and kneaded sufficiently in a kneader. The resulting paste-like mixture was pre-calcined at 300° C. for 5 hours, molded and calcined in the same manner as described in Example 1. Then, the resulting calcined molded articles were impregnated with 100 ml of aqueous solution of palladium nitrate, dried at 120° C. for 5 hours, and calcined in air at 1000° C. for 3 hours. The composition of carrier was Ti:Zr=1:05 in atomic ratio and the amount of palladium supported on the carrier was 2% based on the weight of the carrier.

(b) Catalyst of Comparative Example 3

A precipitate of titanic acid was produced, washed and filtered in the same manner as described in Example 2, followed by pre-calcination at 300° C. for 5 hours. After molding and calcination at 700° C., the resulting calcined molded articles were impregnated with 60 ml of an aqueous solution of palladium nitrate, dried at 120° C. for 5 hours and calcined at 1000° C. in air for 3 hours. The resulting catalyst contained palladium in an amount of 2% based on the weight of titania carrier.

(c) Catalyst of Comparative Example 4

100 Grams of commercially available alumina carrier was impregnated with 60 ml of aqueous solution of palladium nitrate, dried at 120° C. for 5 hours, and calcined at 1000° C. in air for 3 hours. The resulting catalyst contained palladium in an amount of 2% based on the weight of alumina carrier.

(2) CATALYST PERFORMANCE TEST

The above-mentioned catalysts prepared in (a), (b) and (c) were subjected to the catalyst performance test in the same manner as described in Example 1.
The results obtained are shown in Table 2.

TABLE 2

| Example | Component of catalyst | Reaction rate (%) Test time (hour) | |
|---|---|---|---|
| | | 1 | 10 |
| Example 2 | Pd—titania.zirconia | 99.9 | 99.6 |
| Comparative Example 3 | Pd—titania | 97.5 | 71.1 |
| Comparative Example 4 | Pd—alumina | 98.5 | 84.4 |

As is clear from Table 2, the catalyst of Example 2 according to this invention is excellent both in activity and durability compared with the catalysts of Comparative Examples 3 and 4 and the effect of titania.zirconia series carrier is clear.

EXAMPLE 3

Five kinds of catalysts changing the composition of carrier, i.e. titania and magnesia, as shown in Table 3 were prepared in the same manner as described in Example 1. Performance of these catalysts was tested in the same manner as described in Example 1.
The results obtained are shown in Table 3.

TABLE 3

| Run No. | Composition of carrier (atomic ratio) | | Reaction rate (%) Test time (hour) | |
|---|---|---|---|---|
| | Titania | Magnesia | 1 | 10 |
| 1 | 1 | 0.02 | 89.1 | 71.2 |
| 2 | 1 | 0.05 | 97.1 | 90.0 |
| 3 | 1 | 0.2 | 99.0 | 97.1 |
| 4 | 1 | 0.9 | 98.0 | 94.1 |
| 5 | 1 | 2 | 89.7 | 77.5 |

As is clear from Table 3, when the composition ratio of titania to magnesia in atomic ratio is 1:0.05 to less than 1:1 (Run Nos. 2 to 4), there can be obtained catalysts more excellent in performance. When the composition ratio of titania to magnesia in atomic ratio is 1:0.2 to less than 1:1, there can be obtained catalysts particularly excellent in performance.

Almost the same results were obtained when other second components other than magnesia were used.

EXAMPLE 4

Seven kinds of catalysts were prepared using as the second component strontium oxide, lanthanum oxide, yttria, ceria, zirconia, silica or stannic oxide in place of magnesia in the same manner as described in Example 1. Performance of these catalysts was tested in the same manner as described in Example 1.
The results obtained are shown in Table 4.

TABLE 4

| Run No. | Component of catalyst | Reaction rate (%) Test time (hour) | |
|---|---|---|---|
| | | 1 | 10 |
| 1 | Pt—titania.SrO | 99.6 | 99.3 |
| 2 | Pt—titania.La$_2$O$_3$ | 99.9 | 99.7 |
| 3 | Pt—titania.Y$_2$O$_3$ | 99.8 | 99.6 |
| 4 | Pt—titania.CeO$_2$ | 99.8 | 99.5 |
| 5 | Pt—titania.ZrO$_2$ | 99.9 | 99.8 |
| 6 | Pt—titania.SiO$_2$ | 99.7 | 99.5 |
| 7 | Pt—titania.SnO$_2$ | 99.7 | 99.4 |

As is clear from Table 4, the catalysts of this invention are excellent both in activity and durability.

EXAMPLE 5

Three kinds of carriers of 3 components combination of titania-zirconia-silica, titania-zirconia-ceria and titania-zirconia-lanthanum oxide were prepared and palladium as the precious metal was supported on these carriers in an amount of 0.5% based on the weight of the carrier. Performance of the resulting three catalysts was tested in the same manner as described in Example 1.

Compositions of carriers and performance test results using these catalysts were listed in Table 5.

As is clear from Table 5, the catalysts using the 3-component carriers also have excellent activity and durability.

TABLE 5

| Run. No. | Composition of carrier | | | | | | Reaction rate (%) Test time (hour) | |
|---|---|---|---|---|---|---|---|---|
| | Component | Atomic ratio | Component | Atomic ratio | Component | Atomic ratio | 1 | 10 |
| 1 | Titania | 1 | Zirconia | 0.3 | Silica | 0.2 | 99.8 | 99.6 |
| 2 | Titania | 1 | Zirconia | 0.3 | Ceria | 0.2 | 99.7 | 99.4 |
| 3 | Titania | 1 | Zirconia | 0.3 | Lanthanum oxide | 0.3 | 99.8 | 99.5 |

As explained above, according to this invention, catalysts for catalytic combustion excellent in performance such as activity and durability can be obtained by supporting precious metal particles on a carrier obtained from (a) titania and (b) at least one metal oxide selected from oxides of Sr, Mg, La, Y, Ce, Zr, Si and Sn.

What is claimed is:

1. A catalyst for catalytic combustion consisting essentially of precious metal particles of at least one member selected from the group consisting of platinum, palladium, ruthenium, iridium and rhodium supported on a carrier obtained from (a) a first component of titania and (b) a second component of at least one metal oxide selected from the group consisting of oxides of magnesium, strontium, lanthanum, yttrium, cerium, zirconium, silicon and tin; the compositional ratio of the first component titania to the second component metal oxide is 1:0.05 to 1:<1 in atomic ratio of Ti:metal of the second component.

2. A catalyst according to claim 1, wherein the amount of said precious metal is 0.1 to 3% by weight based on the weight of the carrier.

3. A catalyst according to claim 1, wherein the second component of the carrier is magnesia.

4. A catalyst according to claim 1, wherein the second component of the carrier is zirconia.

5. A catalyst according to claim 3, wherein the composition ratio of titania to magnesia is 1:0.2 to 1:<1 in atomic ratio of Ti:Mg.

6. A catalyst according to claim 1, wherein the second component of the carrier is strontium oxide.

7. A catalyst according to claim 1, wherein the second component of the carrier is lanthanum oxide.

8. A catalyst according to claim 1, wherein the second component of the carrier is yttria.

9. A catalyst according to claim 1, wherein the second component of the carrier is ceria.

10. A catalyst according to claim 1, wherein the second component of the carrier is silica.

11. A catalyst according to claim 1, wherein the second component of the carrier is stannic oxide.

12. A catalyst according to claim 1, wherein the second component of the carrier is zirconia and silica.

13. A catalyst according to claim 1, wherein the second component of the carrier is zirconia and ceria.

14. A catalyst according to claim 1, wherein the second component of the carrier is magnesia and lanthanum oxide.

15. A catalyst according to claim 1, wherein the second component of the carrier is a mixture of zirconia and lanthanum oxide.

16. A catalyst according to claim 1, wherein the second component is at least one metal oxide selected from the group consisting of oxides of magnesium, strontium, lanthanum, yttrium, cerium, silicon and tin.

17. A catalyst for catalytic combustion consisting of precious metal particles of at least one member selected from the group consisting of platinum, palladium, ruthenium, iridium and rhodium and at least one member selected from the group consisting of nickel, cobalt, manganese and chromium supported on a carrier obtained from (a) a first component of titania and (b) a second component of at least one metal oxide selected from the group consisting of oxides of magnesium, strontium, lanthanum, yttrium, cerium, silicon and tin; the compositional ratio of the first component titania to the second component metal oxide being 1:0.05 to 1:<1 in atomic ratio of Ti:metal of the second component.

18. A catalyst according to claim 17, wherein the amount of the precious metal particles if from 0.1 to 3% by weight based on the weight of the carrier.

* * * * *